(12) United States Patent
Mordukhovich et al.

(10) Patent No.: US 8,318,023 B2
(45) Date of Patent: Nov. 27, 2012

(54) HEATED AIR ASSISTED MEMBRANE SEPARATION OF WATER AND FUEL FROM ENGINE OIL IN AN INTERNAL COMBUSTION ENGINE

(75) Inventors: Gregory Mordukhovich, Bloomfield Hills, MI (US); Andrew M. Mance, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 479 days.

(21) Appl. No.: 12/567,851

(22) Filed: Sep. 28, 2009

(65) Prior Publication Data

US 2011/0073546 A1 Mar. 31, 2011

(51) Int. Cl.
*B01D 15/00* (2006.01)
*B01D 53/22* (2006.01)
*C02F 1/44* (2006.01)
*B01D 61/00* (2006.01)

(52) U.S. Cl. ..... 210/640; 210/651; 210/641; 210/195.1; 95/52

(58) Field of Classification Search ................. 210/640, 210/651, 195, 257, 167.06, 149, 138, 641, 210/195.12; 96/4, 10; 95/52
See application file for complete search history.

(56) References Cited

U.S. PATENT DOCUMENTS

| | | | | |
|---|---|---|---|---|
| 4,933,198 A | * | 6/1990 | Lee et al. | 426/319 |
| 4,952,751 A | * | 8/1990 | Blume et al. | 585/818 |
| 5,013,447 A | * | 5/1991 | Lee et al. | 210/640 |
| 5,149,340 A | * | 9/1992 | Waycuilis | 95/49 |
| 5,227,071 A | * | 7/1993 | Torline et al. | 210/651 |
| 6,187,197 B1 | * | 2/2001 | Haddock | 210/641 |
| 6,478,953 B2 | * | 11/2002 | Spearman et al. | 210/130 |
| 6,517,725 B2 | * | 2/2003 | Spearman et al. | 210/640 |
| 7,285,209 B2 | * | 10/2007 | Yu et al. | 210/195.2 |
| 2003/0121858 A1 | * | 7/2003 | Yu et al. | 210/654 |
| 2003/0233934 A1 | * | 12/2003 | Wijmans et al. | 95/46 |
| 2004/0079706 A1 | * | 4/2004 | Mairal et al. | 210/651 |
| 2005/0000904 A1 | * | 1/2005 | Le Bec | 210/694 |
| 2007/0167638 A1 | * | 7/2007 | Brophy et al. | 549/533 |
| 2008/0099400 A1 | | 5/2008 | Nemser et al. | |
| 2008/0128350 A1 | | 6/2008 | Arakawa et al. | |
| 2008/0283019 A1 | | 11/2008 | Arakawa et al. | |
| 2011/0062082 A1 | * | 3/2011 | Mordukhovich et al. | 210/651 |
| 2011/0073546 A1 | * | 3/2011 | Mordukhovich et al. | 210/640 |

FOREIGN PATENT DOCUMENTS

| | | | |
|---|---|---|---|
| CN | 1558941 | | 12/2004 |
| JP | 2000153101 A | * | 6/2000 |
| JP | 2005000904 A | * | 6/2005 |

* cited by examiner

*Primary Examiner* — Ana Fortuna
(74) *Attorney, Agent, or Firm* — Reising Ethington P.C.

(57) ABSTRACT

Contaminating water and/or fuel material may be removed from a stream of internal combustion engine lubricating oil being circulated over parts of an operating engine. A suitable membrane material is supported in a suitable housing. At least a portion of the oil stream is flowed over one side of the membrane and water and/or fuel material diffuses through the membrane to its other side where they are gathered and removed from the housing. The water and fuel material may be recovered separately using different membranes or different regions of a membrane. They may be swept from the membranes and housings using streams of flowing air heated to a pre-selected temperatures using waste engine heat for disposition outside the housing. Application of this practice to other membrane-separable mixtures is described.

19 Claims, 4 Drawing Sheets

HEATED AIR ASSISTED MEMBRANE SEPARATION OF WATER AND FUEL FROM ENGINE OIL IN AN INTERNAL COMBUSTION ENGINE

TECHNICAL FIELD

This disclosure pertains to methods and apparatus for separating water and gasoline (or other fuel) from lubricating oil circulating in an operating engine. More specifically, this disclosure pertains to improved methods for using apparatus in which oil is circulated along surfaces of membranes and water and/or fuel constituents such as gasoline, diesel fuel or ethanol are selectively removed from the oil through the membranes. Heated air flow at a suitable pressure directed over the permeate sides of the membranes enhances removal of the water and fuel constituents from membrane surfaces.

BACKGROUND OF THE INVENTION

Most automotive vehicles are powered by internal combustion engines comprising several complementary cylinders in which closely fitting reciprocating pistons accommodate the introduction of a fuel-air mixture, the compression of the mixture, the combustion of the mixture and the exhaust of combustion products. The fuel may be gasoline, diesel fuel, alcohol-fuel mixtures, alcohol, bio-fuel compositions, or other carbon-containing compositions that are combustible with air. Lubrication of moving parts is accomplished with a suitable hydrocarbon-containing liquid that is pumped from a crankcase at the lower part of the engine and distributed over moving parts of the engine. Circulation of the lubricating oil is completed as it drains back into the sump. The volume of the oil may be several quarts depending on the size of the engine.

At the conclusion of the combustion processes occurring in the cylinder, the cylinder will contain a variety of chemical species including water vapor, unburned fuel and particulates. The majority of these will be exhausted from the cylinder during the exhaust stroke but some fraction will be conveyed past the piston rings into the crankcase (sometimes called blow-by gases) and into contact with the lubricating oil. Thus, as the engine is operated and the oil is circulated it accumulates particulate matter which may be removed by circulating the oil through a filter. But the oil also accumulates water, un-burned fuel material, and other liquid or gaseous combustion by-products which cannot be removed through conventional filtration techniques.

At normal engine operating temperatures these combustion by-products are often sufficiently volatile that they may be ejected from the oil by evaporation. However when an engine is regularly operated for only relatively short periods, particularly at low ambient temperatures, the oil temperature does not increase sufficiently to vaporize and expel these contaminants and they progressively accumulate. This accumulation of water, fuel, and combustion by-products, principally liquids, dilute and contaminate the oil such that it may have to be drained from the engine before its useful properties would have otherwise been depleted.

SUMMARY OF THE INVENTION

This invention provides operating practices and designs for the use of suitable membrane separation devices for effective removal of water and/or fuel constituents (and the like) from lubricating oil as it is being circulated in an operating engine which may be located in a vehicle or in a stationary operation.

Membranes are materials of film-like structures that have lateral dimensions much greater than their thickness and that have a composition and microstructure that permit transfer of selected chemical species through their thickness under suitable driving forces.

This invention makes use of a stream of air at a managed temperature and pressure to more effectively remove chemical species that have diffused through a membrane. This practice may be adapted for the removal of water or fuel materials or both from an operating engine, such as a vehicle engine. In order to provide a more full description in a more limited text, an embodiment of the invention will be illustrated in sections below in this specification in which both water and fuel material (for example, blow-by gas material) are removed from a circulating stream of an internal combustion engine lubrication oil.

In a general embodiment of the invention, at least a portion of the stream of circulating engine lubricating oil is caused to flow along the surface of a suitable membrane. The membrane has a first membrane surface for contact with the circulating oil and an opposite membrane surface for recovery of material separated and removed from the oil. The first surface of the membrane is composed to be impervious to the oil composition but the membrane permits passage of at least one of water and fuel molecules dispersed in the oil. The chemical nature of the membrane surface induces and permits molecules of water and/or fuel to diffuse from the flowing oil through the membrane to the opposite surface. In accordance with the invention, a stream of air is flowed into contact with at least some of the water or fuel material that has diffused through the separator membrane. In preferred embodiments, the air stream may be directed over substantially the entire opposing surface of the membrane to carry away the permeate water molecules or fuel molecules (or both) in a permeate stream. The temperature of the air stream is managed in respect to the temperature of the circulating oil to promote faster and more complete diffusion of the permeate material. Such air flow, managed to vaporize and remove molecules from the second membrane surface, helps to maintain a concentration gradient of contaminant species across the thickness of the membrane that promotes continued separation of water and/or fuel from the flowing oil stream (the remaining oil stream sometimes called a retentate stream).

In general, it may be preferred to remove water from the oil through a first membrane (or membrane region) and fuel or other carbon-containing contaminants through a second membrane region so that the recovered water (and possibly solutes like alcohol) and fuel can be handled separately. For example, water removed from the oil may be discarded to the ambient environment; fuel removed from the oil may be stored, such as for reuse in the engine.

In some embodiments of the invention, the membranes may be in the form of flat films that are supported on flat plates. In other embodiments the membranes used for this oil cleansing process may be in the form of hollow fibers where, for example, water and fuel-laden lubricating oil is flowed around the outer circumferential surfaces of a bundle of fibers and air is flowed through the interior hollows of the fibers to remove water or fuel of blow-by products. In still other embodiments, the membranes may be wound in spiral or other suitable configurations. The respective forms of membranes are often supported within suitable metal or polymeric housings or shells that are shaped and constructed to receive circulated oil (containing globules of water and fuel) into the housing, to direct the oil along the upstream sides of the supported membranes, and to permit cleaned oil to exit the housing and rejoin oil being pumped over engine surfaces.

Modern vehicle engines and their computer control operating systems permit sensing and control of many engine operating parameters. Some of this computer sensed and controlled data may be used in assisting cleaning of the engine oil in accordance with embodiments of this invention. For example, sensing and control of oil temperatures, engine coolant temperatures, and the management of exhaust gas recirculation, exhaust gas treatment, and the like may be used in operation of an oil cleansing membrane separator system. In accordance with practices of this invention, the temperature of oil circulating through a membrane separator of this invention is known. Ambient air may be drawn by a suitable blower or other air mover and delivered to an air inlet in the separator housing for contacting permeate material. The temperature of the air is sensed and it may be heated by heat exchange with exhaust gas in the exhaust line or recirculated exhaust gas, or the like. The rate of flow of the air and its pressure may be controlled by valves or other flow restrictors in the membrane separator housing.

Thus, a preferred embodiment is directed to removal of the contaminant permeate or permeates by passage of a preheated sweep gas stream of air to more efficiently vaporize and carry off the contaminant. The temperature of the preheated gas stream is pre-selected to suitably promote vaporization of the contaminants. Thus, the preheated gas stream should be at a temperature greater than that of the circulating oil but limited by the maximum safe operating temperature of the membrane. As stated a suitably-heated stream of air may be used in removing water from engine oil or fuel constituents from engine oil or both constituents, either simultaneously or serially. The pressure of the air is controlled so that it promotes and does not repress diffusion of permeate material through the membrane.

Practices of the invention may be applied to the removal of water (or water and alcohols), or to the removal of blow-by fuel constituents, or both from circulating engine oil. In many embodiments of the invention water and fuel constituents will be removed using different membranes or different membrane regions. And the temperatures and pressures of the air streams may be different for the water separation and fuel constituent separation.

Although a preferred embodiment has automotive applications, use of heated sweep gas of air or other compositions will beneficially promote permeation in other membrane separation applications and processes.

Other objects and advantages of the invention will be apparent from the descriptions and illustrative embodiments which follow in this specification.

DESCRIPTION OF ILLUSTRATIVE EMBODIMENTS

Figure 1A:
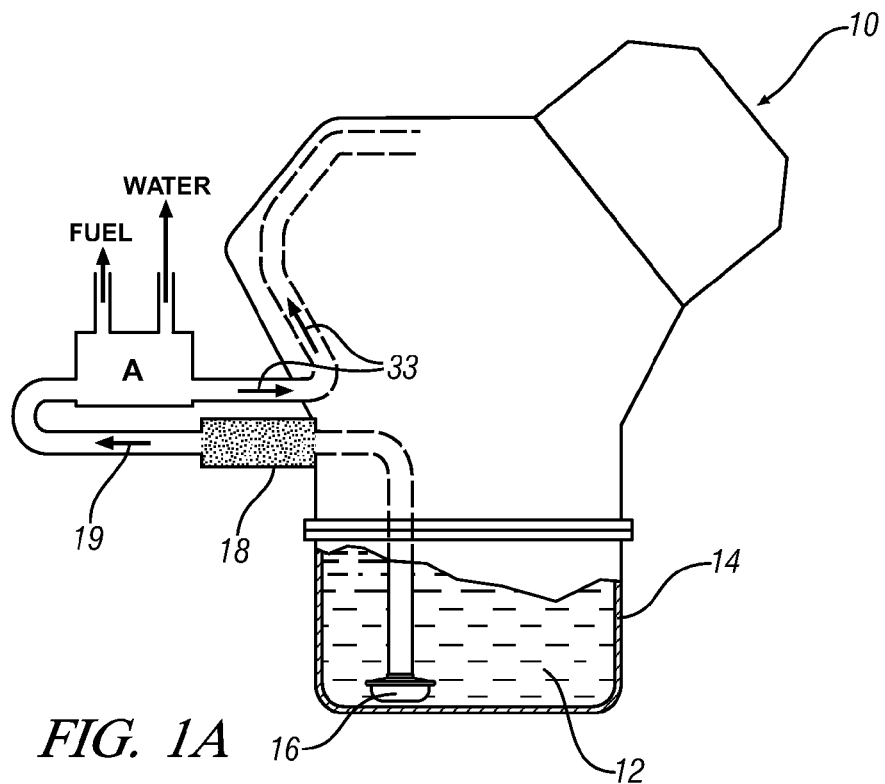
FIG. 1A shows application of a preferred embodiment of a membrane separator device intended for separation of fuel and water contaminants in circulating engine oil in an operating internal combustion engine.
Figure 1B:
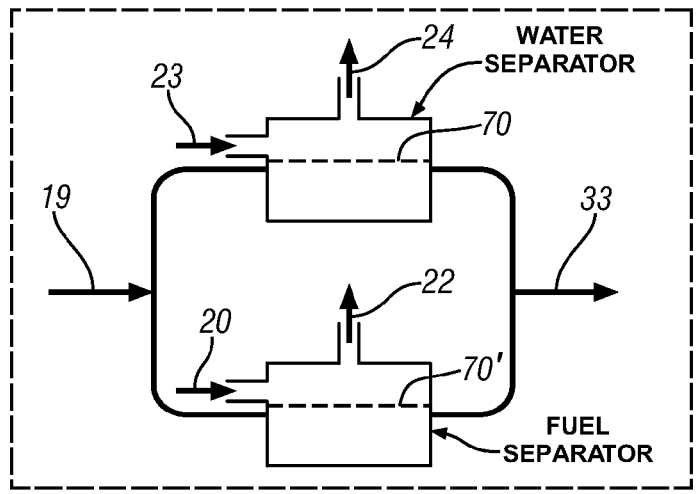
FIGS. 1B-1E illustrate specific separator configurations and corresponding oil, retentate, sweep gas and permeate-containing sweep gas flows.
Figure 1C:
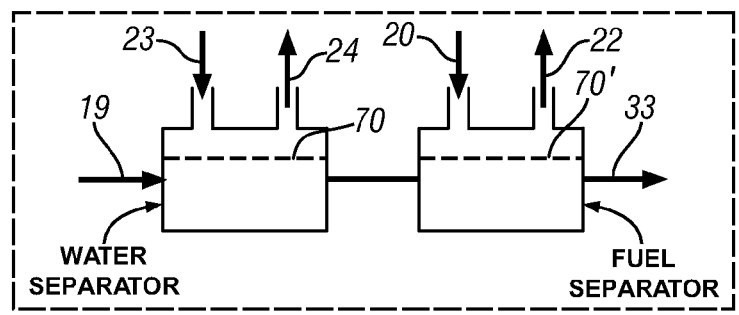
Figure 1D:
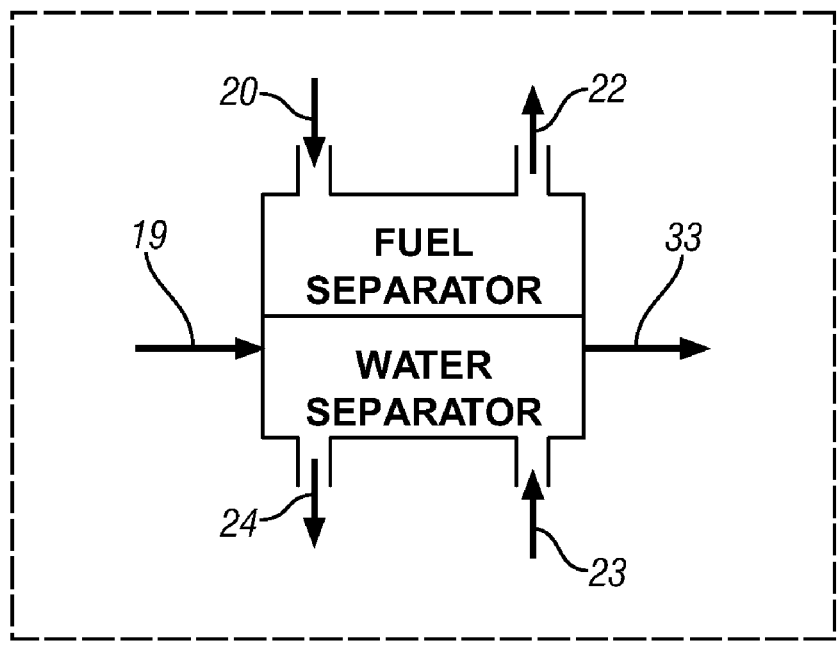
Figure 1E:
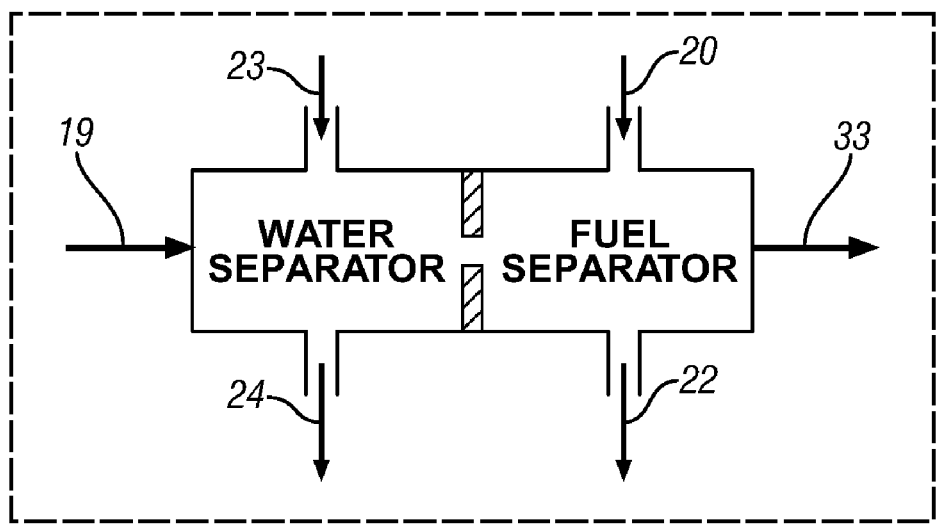

Modern internal combustion engines are built to exacting tolerances and demand the use of superior lubricants. To meet this need, current engine lubricants comprise a sophisticated blend of base oil and appropriate additives to convey the necessary lubrication performance even after considerable use under a wide range of challenging conditions.

One infrequent condition which is not well addressed by current lubricants or lubrication systems arises when vehicle engines are consistently run for only short times. Under this circumstance the lubricating oil reaches its 'normal' operating temperature only rarely and then only for short periods.

During the combustion process, some 'blow-by' occurs which drives some unburned fuel and moisture past the piston rings into the crankcase, where they are incorporated into the lubricating oil. When the oil is maintained at its 'normal' operating temperature, of between 80° C. and 110° C. these volatile contaminants substantially evaporate and are removed. However under consistent short engine operating cycles, particularly under the low ambient temperatures encountered during winter driving, these contaminants and diluents will accumulate and will, if not removed, rapidly degrade the oil's lubricating capabilities.

The accumulation of these contaminants can be significant. Water, as a product of combustion will be plentiful and it is not surprising that, over time, water concentrations of 5% or greater may build up in the lubricating oil. However, in short trip operation, the rich fuel-air mixture typical of cold starts promotes a similar build-up of fuel in the oil and can also lead to gasoline concentrations of greater than 5% in the oil at the end of a winter season. This high concentration of gasoline in the oil is also promoted by the higher boiling point of the constituents of gasoline—only about 50% of the constituents of gasoline vaporize at a temperature less than 125° C.—which makes them more resistant to evaporation than water and thus more likely to accumulate to significant levels. It may be noted that diesel fuel, whose distillation curve, relative to gasoline, is displaced to yet higher temperatures, is expected to accumulate in oil to a still greater extent.

Removal of these contaminating liquids will be achieved using semi-permeable membranes which enable selective transport of constituents of the mixture through the membrane. Atoms and molecules may traverse the membrane by physical transport through pores in the membrane, migrating from the solute-rich environment of the oil on a first side of the membrane to a solute-poor environment on the second side of the membrane. The specificity of different membranes in retaining some molecules while allowing passage to others may be enhanced through appropriate choice of the physical and chemical characteristics of the membrane and may be further modified by application of specific coatings to the membrane. So, in separating water from oil, coatings which are hydrophilic and oleophobic are preferred. For example, coatings that contain groups which are mobile, but highly polar, will associate with polar liquids such as water or alcohols or with other polar groups. The association of the polar groups with each other will act to minimize permeation by hydrophobic molecules. Such groups can be; polyols (such as polyvinyl alcohol chains); groups with carbohydrate side chains; polyacrylic acid or derivatives; polymers containing side chains or side groups with hydroxyl units such as hydroxyphenols; and side chains with ammonium units.

Separation of fuel, either gasoline or diesel fuel, from oil is promoted by coatings which are size selective such that the smaller fuel molecules can diffuse through the mesoporous materials while the larger oil molecules (and emulsifiers, viscosity extenders, and other lubricating oil additives) cannot. An example would be zeolites, aluminosilicates which possess a very regular pore structure of molecular dimensions, in which the pore size may be 'tailored' by cation substitution.

In practices of this invention, preheated air is used as a sweep gas to remove water (including alcohol), or hydrocarbon fuel constituents, or both, from the permeate side of membranes. A ready source of heat, which will consistently exhibit higher temperatures than the lubricating oil is the exhaust. Thus some volume of air may be directed to pass over the vehicle exhaust pipe, preferably at a location which minimizes or eliminates any interference with exhaust gas after-treatment schemes. Further to facilitate efficient heating a heat exchanger may be employed.

The temperature of air heated in this manner will vary with climatic conditions and may achieve temperatures with potential for damage to the membrane. Thus the heated air will be mixed and blended with ambient air under active control in suitable proportions to achieve consistent and suitable pre-selected temperature sweep gas.

These membrane-based separators, intended in a preferred embodiment for removal of water and fuel contaminants from circulating engine oil in an operating internal combustion engine are shown, in aggregate at 'A' in FIG. 1A. Oil 12, contained in engine sump 14, is drawn through oil inlet 16 under the action of an oil pump (not shown). The oil is then directed through oil filter 18 for removal of at least a majority of particulate contaminants before passing as oil flow 19 to separator 'A', where water and fuel dissolved or entrained within the oil are removed. After traversing the separator retentate oil 33 is directed through the engine for lubrication of cams, bearings etc. (not shown) before reurning to sump 14. As will be described, streams of heated air accessible to the permeate sides of membranes enhance the removal of water and fuel contaminants.

Separation of chemically separate species is best accomplished through the use of different membranes or of support membranes with differing surface coatings. Thus separator device 'A' comprises, as shown in FIGS. 1B-E a separator directed to the removal of water and chemically-similar compounds such as alcohols and a second separator prepared primarily for removal of fuel. These independent separator modules may be arranged in parallel as in FIGS. 1B and 1D, or in series as in FIGS. 1C and 1E. Also the separators may be contained in individual housings as in FIGS. 1B and 1C or may be integrated into a single housing as in FIGS. 1D and 1E. Again, preheated air streams are used to remove permeate materials and enhance the effectiveness of the membranes.

Figure 2:
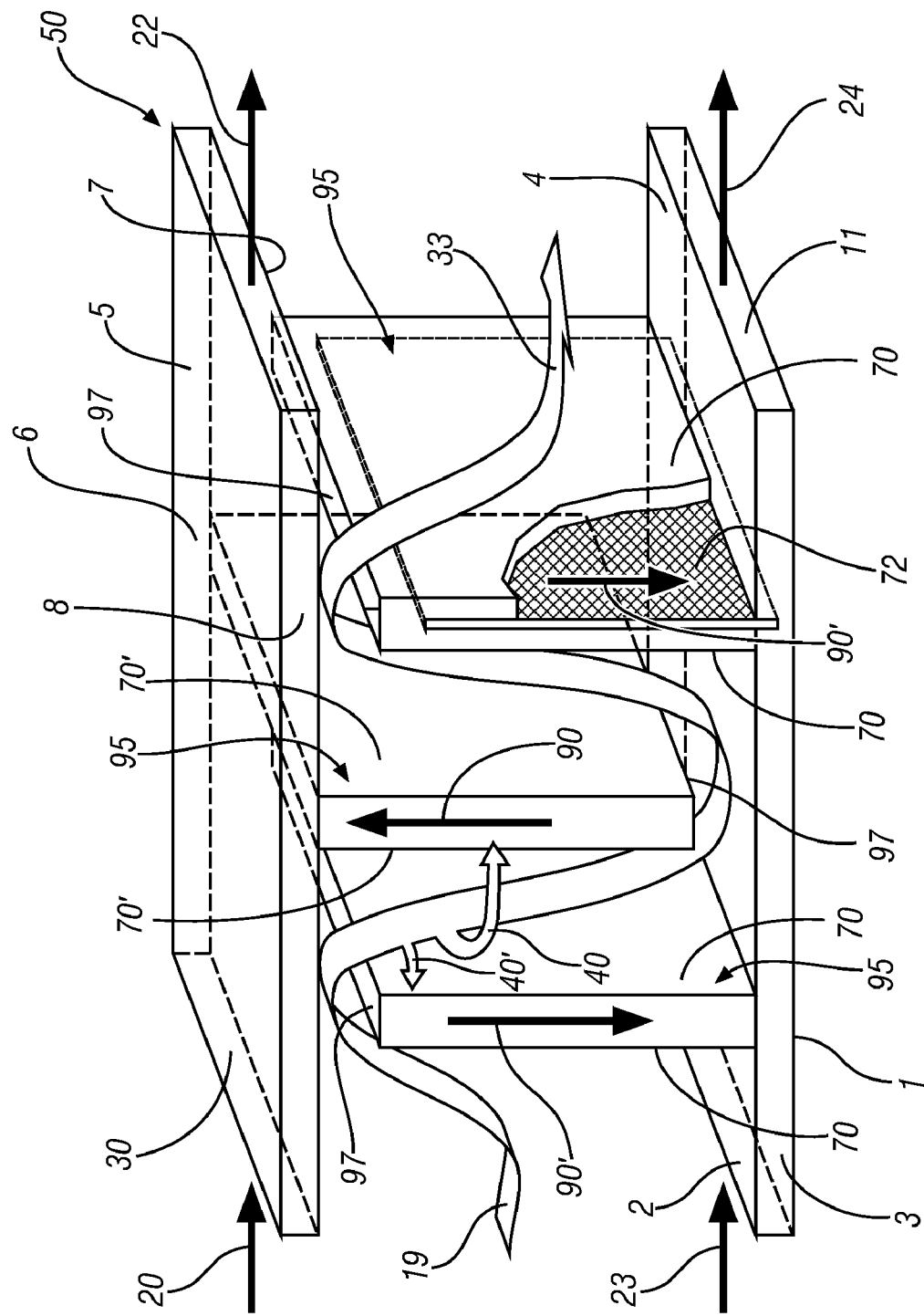
FIG. 2 illustrates a portion of an exemplary, representative cross-flow membrane separation unit suitable for removal of water and fuel from engine lubricating oil in which the incoming engine oil follows a turbulence-inducing path and passes over generally planar membranes suitable for either fuel or water removal.

All of FIGS. 1B-1E show, in common with FIG. 1A, an incoming contaminated oil stream 19 which after passage through the separators is transformed into permeate-depleted retentate stream 33. Within the water separator, a suitable membrane 70 (shown only in FIGS. 1B and 1C) is positioned such that oil flow 19 contacts and flows over a first surface of the membrane 70. The second side of the membrane is exposed to sweep gas stream 23 which vaporizes and acquires the water-based permeate passing through the membrane to the second surface of the membrane. Permeate-containing sweep gas stream 24 then exits the separator. Within the fuel separator, oil flow 19 contacts the first surface of suitable membrane 70' (shown only in FIGS. 1B and 1C). The second side of membrane 70' is exposed to sweep gas stream 20 which vaporizes and acquires the fuel-based permeate passing through the membrane to the second surface of the membrane. Permeate-containing sweep gas stream 22 then exits the separator A portion of an exemplary membrane-separation device adapted to operate in parallel for separation of water and oil is shown at 50 in FIG. 2. This is a cross-flow device, that is one in which the oil flow passes laterally across the membranes, here in generally planar configuration. This device is intended for simultaneous separation of water and fuel from oil but could readily be adapted for removal of only one contaminant in applications where only a single contaminant is present. The device comprises three sets of inlet flow channels, one for oil and one each for sweep gas intended for removal of water (and alcohol) permeate and fuel permeate. Three outlets are provided, one for the outlet oil flow and one each for the fuel- and water-containing sweep gas. In this embodiment the sweep gas is air preheated to a temperature greater than the oil temperature to promote vaporization and removal of the permeate(s). These fluid flows do not interact directly and each follows its own prescribed flow path without mixing with the other. The only interaction is the transference of the permeate from the input oil stream to the sweep gas streams mediated by the semi-permeable membrane which separates the flows and a separator which conveys the permeate flow into contact with the sweep gas.

It will be recognized that the following description is directed toward only a portion of a suitable separator and that the structural elements shown are representative of a serial assemblage of such elements each of which will contribute a portion of the total permeate collected. Oil flow 19, passes through the device and encounters a series of membrane assemblies 95. Membrane assemblies 95 alternately attached to surface 2 and to surface 7 of a generally rectangular tube (side walls not shown) which force the oil to follow a convoluted path with multiple changes in flow direction.

This convoluted oil flow path induces considerable turbulence in the oil. Further, oil flow path 19 directs the oil to flow laterally along each of the membrane assemblies 95 and enforces good contact between the oil and membranes 70 or 70' on opposing faces of successive membrane assemblies 95.

Membrane assemblies 95 have the appearance of a shallow box open to manifolds 11 or 30 on one end, sealed on two sides by the walls (not shown) of the rectangular tube and sealed on their end by closure 97. Membranes 70 and 70' are on the two opposing surfaces with the largest dimensions. Membrane assemblies 95 also comprise a generally planar membrane separator 72, located internal to the assembly and positioned between the opposing membranes and in good contact with both membranes. The function of the membrane separator 72 is to accept permeate passing through the membrane, as shown by way of example at 40 and 40', and transport the permeate by capillary action along the separator as indicated by flows 90 and 90'. Continued transport along the separator exposes the separator 72 and permeate it is transporting into contact with sweep gas flows 20 and 23 flowing through manifolds 30 and 11 bounded by surfaces 1, 2, 3 and 4 (manifold 11) and 5, 6, 7 and 8 (manifold 30). Vaporization of the permeate in contact with the sweep gas flow and its incorporation in the sweep gas produces permeate-containing gas flows 22 and 24, while now permeate-depleted oil exits the device as oil flow 33.

The overall process for removal of the fuel and water is thus a serial process comprising: transport of the contaminant from the oil through the membrane; then capillary transport of the contaminant to the manifold; followed by vaporization of the contaminant; dissolution of the contaminant in the sweep gas; and its transport from the membrane by the flowing sweep gas.

It will be appreciated that it would also be feasible to have the heated sweep gas directly contact the side of the membrane opposite the side contacted by the flowing oil. In the configuration shown, this would entail removing the membrane separator and directing the sweep gas flow, by provision of suitable internal baffles through the interior of membrane structure 95. In alternate separator designs which do not require membrane separators, such as tubular membrane designs (not shown), direct sweep gas membrane contact is characteristic of the design.

Two driving forces promote the process of transport through the pores of the membrane. The first is any pressure differential existing across the membrane and the second is the osmotic pressure which results from concentration differences of the mobile species across the membrane. These pressures may act in support of, or in opposition to, one another but in practice of this invention it is intended that both pressures act in concert to promote species transport.

The maximum pressure differential is essentially fixed since it is established by the engine oil pressure and, even without this limitation would be restricted by the physical properties of the membrane or the membrane and its support. Thus the concentration difference of the migrating species across the membrane is more effective in controlling the flux, or flow rate per unit area of membrane, of the migrating species.

The concentration difference is substantially established by the species concentration on the second side of the membrane. If the species, once transported through the membrane can be efficiently removed, the concentration difference will remain large and continued migration through the membrane will occur. If the species cannot be efficiently removed, then the concentration difference across the membrane will fall and migration through the membrane will slow.

Strategies for removing the migrating species generally employ gas phase removal and include establishing a vacuum at the second side of the membrane and passing a sweep gas over the second side of the membrane. Both approaches however require that heat be supplied to provide the latent heat of vaporization to the migrated species. If, as is usually the case, the primary source of heat is the liquid flowing over the first surface of the membrane, then extraction of the latent heat of vaporization lowers the liquid temperature and reduces the migration rate. For the system under consideration which is intended to efficiently remove water and fuel where the lubricating oil temperature is already depressed below its 'normal operating value' such a drop in migration rate is not preferred.

Thus to maintain high rates of contaminant removal it is proposed that the sweep gas be pre-heated. More specifically it is proposed that the sweep gas be pre-heated to a temperature greater than the oil temperature using engine waste heat so that the vapor pressure of the permeate may be increased to facilitate its removal. Such an approach, properly controlled, is capable of ensuring that maximum removal of engine oil contaminants may be achieved even at temperatures which are low relative to the boiling points of the migrating species. It will be appreciated that the elevated sweep gas temperature will be especially effective in promoting removal of higher distillation temperature fractions of fuel components and thus for removal of diesel fuel. It will also be appreciated that the use of heated sweep gas will confer benefits in all membrane separation processes and that the utility of this invention is not restricted or limited to removal of contaminants from engine oil. The maximum sweep gas temperature should be informed by the properties of the membrane. It is intended that the membrane operate for extended periods under the pressure of the engine oil and thus the maximum sweep gas temperature must be limited to avoid any mechanical or thermal damage to the membrane or reduction in its transport efficiency.

For an engine operating in a vehicle, it is preferred to use waste engine heat to preheat the sweep gas. Also it is preferred to use air as the sweep gas. These specific approaches are conditioned on the ready availability of waste heat from the engine exhaust and the chemical character of the contaminants in the engine oil which render them compatible with air as a sweep gas. Other applications might employ combustion or electrical heating of the sweep gas and employ other sweep gas compositions. Thus it should not be inferred that the invention is in any way limited by these preferred heat sources and sweep gas composition.

The exhaust temperature will increase before either the coolant or the oil temperatures. Thus, drawing the sweep air over the vehicle exhaust, preferably using a heat exchanger to maximize heat transfer, will enable the use of heated sweep gas (air) even very early in the engine warm-up cycle and will facilitate extraction of water and fuel. Preferably the heated sweep air is drawn from a heat exchanger mounted on the exhaust close to the engine but downstream of the catalytic converter. More preferably, the sweep air will comprise both heated air from the exhaust-mounted heat exchanger mixed with unheated external or engine compartment air in controlled amount so that sweep air may be controllably delivered at a pre-selected temperature, largely independent of the ambient air temperature or the exhaust temperature.

The temperature of the sweep air should pre-selected such that for an engine at its normal operating temperature, the incoming sweep air temperature is greater than the oil temperature but comfortably lower than the maximum membrane operating temperature. Generally, since normal engine operating temperature is about 110° C., a sweep gas temperature of between 120° C. and 140° C. is preferred.

Figure 3:
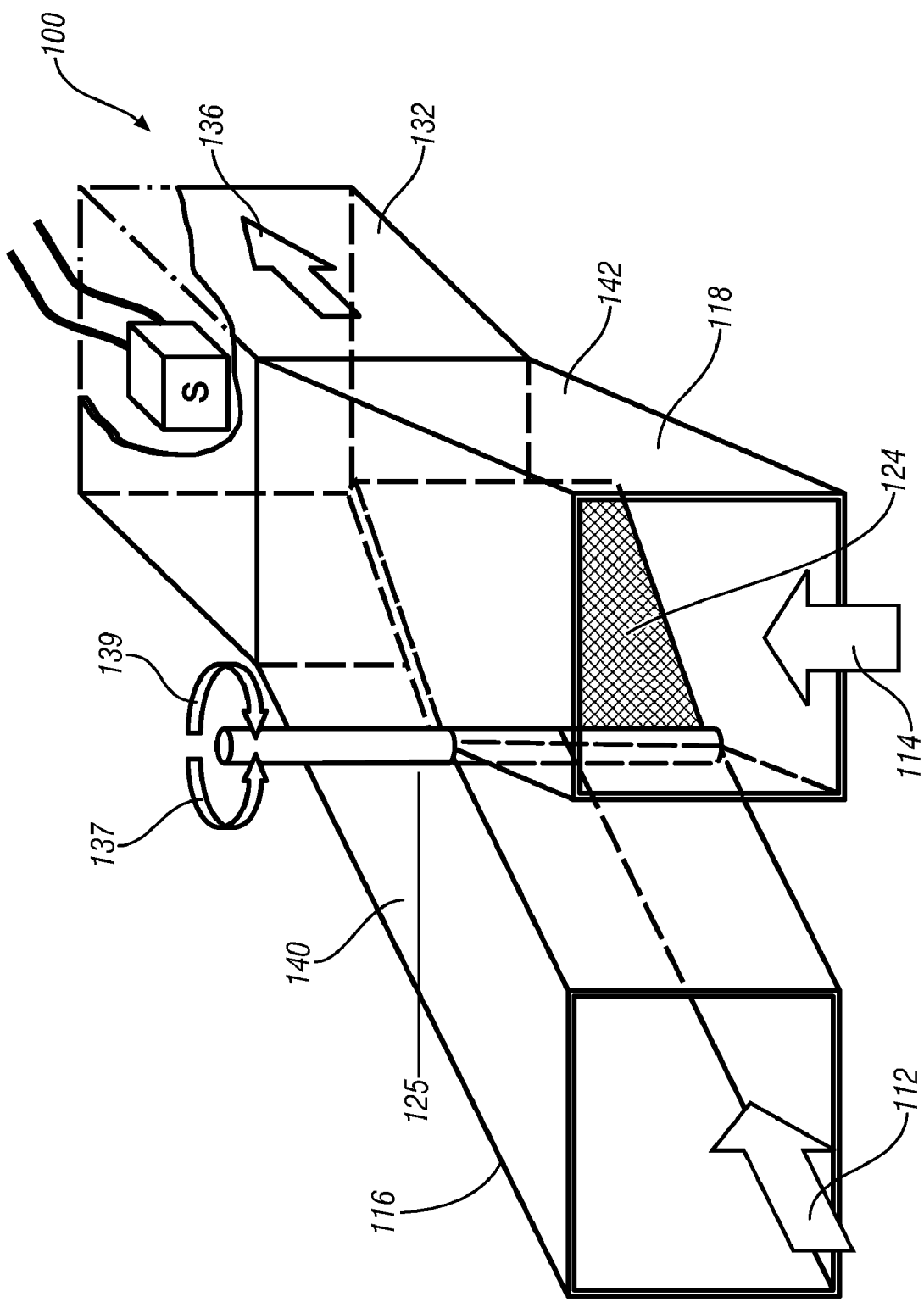
FIG. 3 shows a perspective view of an air mixing unit suitable for mixing ambient and heated air, which when operated under closed-loop control will maintain a flowing volume of sweep gas at a pre-selected temperature.

A variety of devices and control approaches might be used to achieve this heated sweep gas and an example of such a device 100 incorporating a controlled mixing chamber, is shown in FIG. 3. There are two inlet air streams: an ambient air stream 112 which may be drawn from any convenient source such as outside air or engine compartment air and a heated air stream 114 comprising the air heated by passage over the vehicle exhaust pipe. These inlet air streams, ambient air stream 112 flowing through ambient air inlet 116 and heated air stream 114 flowing through heated air inlet 118, merge to form a common outlet stream 136 flowing through outlet 132. The flow passages are arranged in a 'Y' configuration with the outlet 136 forming the 'leg' of the 'Y' and suitable vortex generators or similar (not shown) incorporated in the walls of the flow passages to encourage thorough mixing. Flapper valve 124 is attached to axle 125 which is capable of bi-directionally rotating in bushings or similar structures (not shown) appropriately positioned in upper 140 and lower 142 surfaces of the "Y" and located at the junction of the "Y". Flapper valve 124 depending on its position relative to inlets 116 and 118 may admit exclusively heated air or exclusively ambient air or mixtures of both. A temperature sensor/transducer "S" capable of interfacing with a suitable control circuit (not shown) and actuator/driver circuit (not shown) is appropriately mounted in outlet 132 to reliably measure the temperature of outlet air flow stream 136. The sensor/transducer may be, for example, one of a thermistor, thermocouple, bimetallic strip or Bourdon tube, capable, when interfaced with a suitable control and driver circuit, of operating an actuator such as a stepper motor (not shown)

operably connected to flapper valve shaft 125. Hence under the influence of the actuator, shaft 125 will rotate in the direction indicated by arrow 137 or arrow 139 to maintain outlet flow 136 at the desired temperature as sensed by sensor "S".

The actuator and controller are adapted to enable flapper valve 124 to adopt a full range of positions between fully blocking inlet 116 to fully blocking inlet 118. Thus, on initial engine start it is intended that flapper valve 124 would be positioned to substantially block ambient air inlet 116 and that output flow 136 directed to the membrane separator device would be comprised of heated air from inlet 118. As the engine continues to run and the exhaust gas temperature rises the temperature of heated air stream 114 will also rise. When the temperature of heated air stream rises above a pre-set temperature as sensed by sensor/transducer "S" the actuator is commanded to rotate shaft 125 to partially block heated air inlet 118 and partially unblock ambient air inlet 116. This will enable mixing of inlet streams 112 and 114 to bring the temperature of outlet stream 136 to its intended value where it may be maintained by continued repositioning of flapper valve 124 responsive to the output of sensor/transducer "S". The actuator is capable of bi-directional operation, that is shaft 125 may rotate in both the direction of arrow 137 and arrow 139, so that the temperature of outlet flow 136 may be maintained even if the heated air inlet temperature were to momentarily decrease, for example as a result of road splash.

The discussion of a limiting sweep gas temperature has focused on an absolute temperature limit set by the membrane composition or structure. A more complex situation will occur if it is desired to limit the temperature difference between each side of the membrane. In this embodiment, the sweep gas temperature measured by sensor 'S' would be compared with the on-vehicle engine oil temperature sensor and the actuator control scheme would be based on the maximum allowable temperature difference between the oil and the sweep air.

Thus sweep gas temperature control device 100 and membrane separator 50 will cooperatively interact to facilitate removal of fuel and/or water contaminants from their respective second membrane surface. It is preferred that, for constancy of flow, flow of both ambient air or heated air should be promoted by means of a separate fan positioned to promote exit flow 136 and thereby induce flows 112 and 114. Alternative flow sources exist, for example ram air attendant on vehicle motion or redirection of a portion of the output of the engine cooling fan. These however will produce an air flow which varies more with vehicle or engine operating conditions and will therefore place greater demands on the temperature control system.

The output of the sweep gas heater may be directed to various configurations of separator devices which are suitable for practice of the invention. These include those employing planar membrane separators as in the example shown in FIG. 2 but spiral wound membrane separators and hollow tubular membrane separators may be readily adapted.

Yet further enhancement of the transfer of permeate into the sweep gas stream may be achieved by reducing the sweep gas pressure. This may be accomplished to at least some modest extent through design of the separator by making use of Bernoulli's principle. For inviscid flows any increase in fluid flow rate in a closed system, even for compressible fluids like air, will result in a decrease in pressure. Thus in the design illustrated in FIG. 2 manifolds 11 and 30 may be fed by other inlet manifolds (not shown) of larger cross-sectional area than manifolds 11 and 30 forcing sweep gas flows 20 and 23 to accelerate as they traverse the manifold and thus lower their pressure to enhance permeate volatilization. Similar behavior may be induced in other separator configurations such as those based on spiral wound or planar membranes by similarly constricting the sweep gas flow during the period it interacts with the permeate.

The output from the overall approach depicted in FIG. 1A is two vapor-containing streams of permeate—either water or fuel. The water stream may simply be vented to air, but the fuel stream should be recycled for use in the engine. An obvious approach is to route the sweep gas to the engine intake manifold to provide an additional source of fuel. If this is done, it may be feasible to 'power' the sweep gas flow through engine manifold vacuum. An alternative however is to route the sweep gas to the exhaust manifold where it could serve as a reductant for $NO_x$ emissions. This would be of especial value in lean burn engines whose exhaust typically is reductant-poor.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A method of removing at least one vaporizable contaminant from a stream of oil circulated for lubrication of engine parts in an operating internal combustion engine, the operation of the engine being managed with a computer control system which senses a temperature of the circulating oil, the method comprising:
   diverting at least a portion of the contaminant-containing oil stream to a membrane located for receiving the engine lubricating oil flow, the membrane having a thickness and first and second opposing surfaces, and flowing the stream portion over the first surface of the membrane, the oil flow engaging the first surface of the membrane such that some contaminant leaves the oil stream and passes from the first surface to the second surface of the first membrane;
   contacting contaminant from the second surface of the membrane with a flowing stream of heated air of predetermined temperature sufficient to at least partially vaporize the contaminant so that the contaminant vapor is incorporated in the flowing air stream and removed from the second surface of the membrane; and
   continuing to circulate contaminant-containing oil over the membrane during engine operation.

2. A method as recited in claim 1 in which the contaminant comprises water.

3. A method as recited in claim 1 in which the contaminant comprises hydrocarbon fuel material.

4. A method as recited in claim 1, the method further comprising diverting at least a portion of the contaminant-containing oil stream to a second membrane, the oil having water as a first contaminant and hydrocarbon fuel material as a second contaminant, the water contaminant leaving the oil stream by passage from a first surface of the membrane to a second surface of the membrane and the hydrocarbon fuel material leaving the oil stream by passage from a first surface of the second membrane to a second surface of the second membrane.

5. A method as recited in claim 4 wherein water removed from the first membrane and hydrocarbon fuel material removed from the second membrane are separately disposed of during engine operation.

6. A method as recited in claim 1 in which the heated air is heated using waste engine heat.

7. A method as recited in claim 6 in which the temperature of the heated air is pre-selected so as to not exceed a temperature suitable for long-term membrane performance.

8. A method as recited in claim 6 in which the temperature of the heated air is pre-selected so as to maintain a specified temperature above the temperature of the oil.

9. A method of removing water and fuel material from an operating internal combustion engine in which a stream of oil is circulated for lubrication of engine parts, the water and fuel material entering the oil during engine operation, the operation of the engine being managed with a computer control system which senses a temperature of the circulating oil; the method comprising:

diverting at least a portion of the water-containing and fuel-containing oil stream to a first membrane and a second membrane, each membrane being located for receiving the engine lubricating oil flow and having a thickness and first and second opposing surfaces, and flowing the oil stream portion over the first surfaces of each membrane, the oil flow engaging the first surface of the first membrane such that some water leaves the oil stream and passes from the first surface to the second surface of the first membrane and the oil stream engages the first surface of the second membrane such that some fuel material leaves the oil stream and passes from the first surface to the second surface of the second membrane;

contacting water from the second surface of the first membrane with a flowing stream of heated air at a temperature sufficient to at least partially vaporize the water so that the water vapor is incorporated in the flowing air stream and removed from the second surface of the membrane thereby promoting continued passage of water through the first membrane and continued removal of water from the membrane;

contacting fuel material from the second surface of the second membrane with a flowing stream of heated air at a temperature sufficient to at least partially vaporize the fuel material so that the fuel vapor is incorporated in the flowing air stream and removed from the second surface of the second membrane thereby promoting continued passage of fuel material through the second membrane and continued removal of water from the second membrane; and continuing to circulate water-containing and fuel-containing oil over the first and second membranes during engine operation.

10. A method as recited in claim 9 wherein water removed from the first membrane and hydrocarbon fuel material removed from the second membrane are separately disposed of during engine operation.

11. A method as recited in claim 9 in which the heated air streams are heated using waste engine heat.

12. The method as recited in claim 9 in which the temperatures of the heated air streams are pre-selected so as to not exceed a temperature suitable for long-term membrane performance.

13. The method as recited in claim 9 in which the temperatures of the heated air streams are pre-selected so as to maintain specified temperatures above the temperature of the water-containing and fuel-containing oil.

14. A method of removing at least one vaporizable constituent of an oil-liquid mixture, the method comprising:

contacting at least a portion of the oil-liquid mixture with a first surface of a membrane, the membrane having a thickness and first and second opposing surfaces and the membrane being selected to permit passage of the constituent to be removed while substantially denying passage to other constituents of the oil-liquid mixture; and establishing a concentration gradient in the constituent to be removed across the thickness of the membrane by passing a flowing stream of gas at pre-selected temperature across the second surface of the membrane, the pre-selected temperature being sufficient to at least partially vaporize the constituent so that the constituent vapor is incorporated in the flowing air stream and removed from the second surface of the membrane to render an oil substantially free of the vaporizable constituent.

15. The method of claim 14 further comprising continuously flowing the oil-liquid mixture across the first surface of the membrane.

16. An engine oil flow-through apparatus for placement in an engine oil lubrication system of an internal combustion engine, the apparatus comprising;

a housing comprising a first opening for admitting a stream of water-containing and fuel material-containing engine lubrication oil and a second opening for releasing a stream of water-depleted and fuel material-depleted oil;

the housing containing two membranes, a first membrane and a second membrane, each membrane being located and adapted for receiving the engine lubricating oil flow and having a thickness and first and second opposing surfaces, the first surfaces of each membrane being located and adapted for oil flow engaging the first surface of the first membrane such that some water leaves the oil stream and passes from the first surface to the second surface of the first membrane and the first surface of the second membrane region being located and adapted such that some fuel material leaves the oil stream and passes from the first surface to the second surface of the second membrane;

the apparatus further comprising a second opening for admitting heated air into the housing, the housing comprising flow passages for partitioning the admitted heated air into at least two flows;

a first flow being directed to at least access the second surface of the first membrane and a second flow being directed to at least access the second surface of the second membrane;

the housing still further comprising outlets for removal of the first flow and the second flow.

17. The apparatus of claim 16 further comprising an apparatus for supplying heated air of controlled temperature.

18. The apparatus of claim 17 wherein the controlled temperature heated air results from the controlled mixing of a high temperature and a low temperature air flow.

19. The apparatus of claim 18 wherein the high temperature air flow results from the passage of air over a heated engine exhaust.

* * * * *